United States Patent
Foley et al.

(10) Patent No.: US 9,386,822 B2
(45) Date of Patent: Jul. 12, 2016

(54) DECORATIVE SHOE LACE CINCHER

(71) Applicant: Fizoos, Ltd., Aspen, CO (US)

(72) Inventors: Whitney Foley, Aspen, CO (US);
Kristeen Church, Aspen, CO (US);
William Matthew Foley, Aspen, CO (US); Zachary Conrad, Denver, CO (US); Michael Cole, Longmont, CO (US)

(73) Assignee: Fizoos, Ltd., Aspen, CO (US)

( * ) Notice: Subject to any disclaimer, the term of this patent is extended or adjusted under 35 U.S.C. 154(b) by 247 days.

(21) Appl. No.: 14/271,069

(22) Filed: May 6, 2014

(65) Prior Publication Data

US 2014/0325806 A1    Nov. 6, 2014

Related U.S. Application Data

(60) Provisional application No. 61/819,910, filed on May 6, 2013.

(51) Int. Cl.
    *A43C 11/24*  (2006.01)
    *A43C 7/08*   (2006.01)
    *F16G 11/10*  (2006.01)

(52) U.S. Cl.
    CPC . *A43C 11/24* (2013.01); *A43C 7/08* (2013.01); *F16G 11/101* (2013.01); *Y10T 24/3703* (2015.01); *Y10T 24/375* (2015.01); *Y10T 24/3713* (2015.01)

(58) Field of Classification Search
    CPC . F16G 11/101; Y10T 24/375; Y10T 24/3703; Y10T 24/3713; A43C 7/08; A43C 11/24
    See application file for complete search history.

(56) References Cited

U.S. PATENT DOCUMENTS

| | | | |
|---|---|---|---|
| 6,357,093 B1 * | 3/2002 | Takahashi | A43C 3/00 24/712 |
| 7,143,486 B2 * | 12/2006 | Rolla | A43C 7/02 24/712.9 |
| D554,847 S | 11/2007 | Schmelzer et al. | |
| 7,588,331 B2 | 9/2009 | Burnstein | |
| 7,698,836 B2 | 4/2010 | Schmelzer et al. | |
| D628,372 S | 12/2010 | Bell et al. | |
| 8,069,538 B2 | 12/2011 | Wilcox | |
| 8,122,519 B2 | 2/2012 | Schmelzer et al. | |
| 8,266,769 B2 | 9/2012 | Murray et al. | |
| 8,590,121 B1 | 11/2013 | Patt, Jr. et al. | |
| 8,622,540 B2 | 1/2014 | Burnstein | |
| 2009/0223085 A1 * | 9/2009 | Wolfberg | A43C 7/08 36/50.1 |

* cited by examiner

*Primary Examiner* — Robert J Sandy
(74) *Attorney, Agent, or Firm* — Snell & Wilmer L.L.P.

(57) ABSTRACT

The present disclosure relates to a decorative cincher comprising a decorative element, a cincher, and a post, the cincher being useful in securing one or more shoe laces.

17 Claims, 8 Drawing Sheets

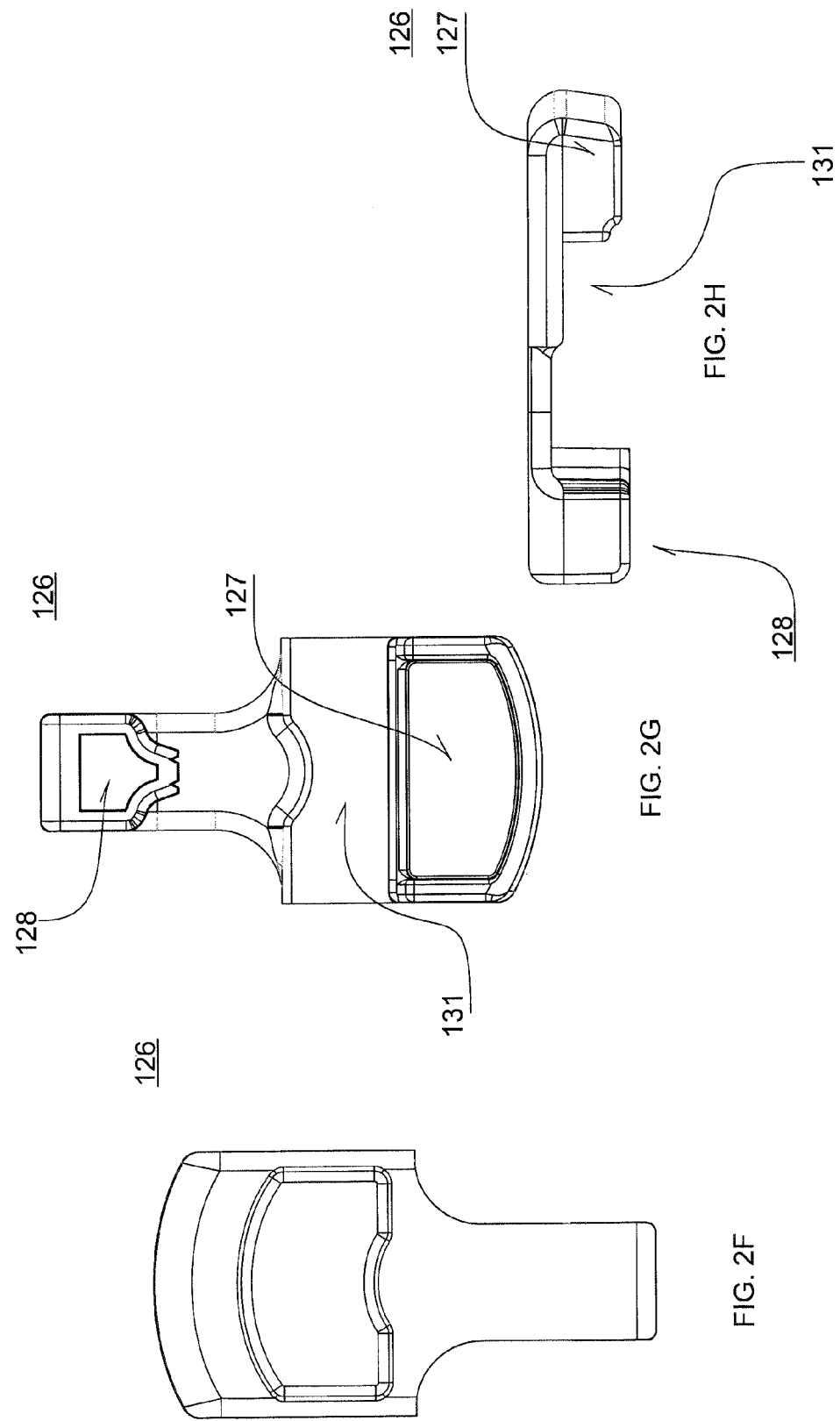

DECORATIVE SHOE LACE CINCHER

CROSS-REFERENCE TO RELATED APPLICATION

This application claims priority to U.S. Provisional Patent Application Ser. No. 61/819,910 filed on May 6, 2013 and entitled "Decorative Shoe Lace Cincher," which is incorporated herein by reference in its entirety.

BACKGROUND

1. Field

The present disclosure relates to a securing one or more shoe lace ends.

2. Discussion of the Related Art

Many individuals have difficulty tying shoes laces, whether due to being young in age or lacking the necessary dexterity or flexibility to reach their shoes for even the brief period of time needed to tie their shoes laces. In the case of young children who are unable to tie shoe laces, caregivers may not notice shoe laces becoming untied, leading to potentially embarrassing or dangerous situations. Caregivers, on the other hand, may notice shoe laces becoming untied, yet be bothered by continually having to re-tie them. Other individuals, while able to tie shoe laces, may find the process annoying.

Fashion trends come and go increasingly fast, often more quickly than an individual may grow out of, or otherwise "wear out," a pair of shoes. Similarly, an individual often cannot capture all of the current fashion trends in a single pair of shoes.

What is therefore needed is a decorative shoe lace cincher.

SUMMARY

The present disclosure relates to a decorative shoe lace cincher comprising a decorative element, a cincher, and a post, wherein the decorative element is coupled to the post, and the post can be removeably attached to either a shoe lace or the cincher.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure, in which like numerals denote like elements and:

FIGS. 2F, 2G and 2H illustrate front, back and side views respectively of an actuator element of a cincher in accordance with the present disclosure;

DETAILED DESCRIPTION OF THE ILLUSTRATED EMBODIMENTS

Figure 1B:
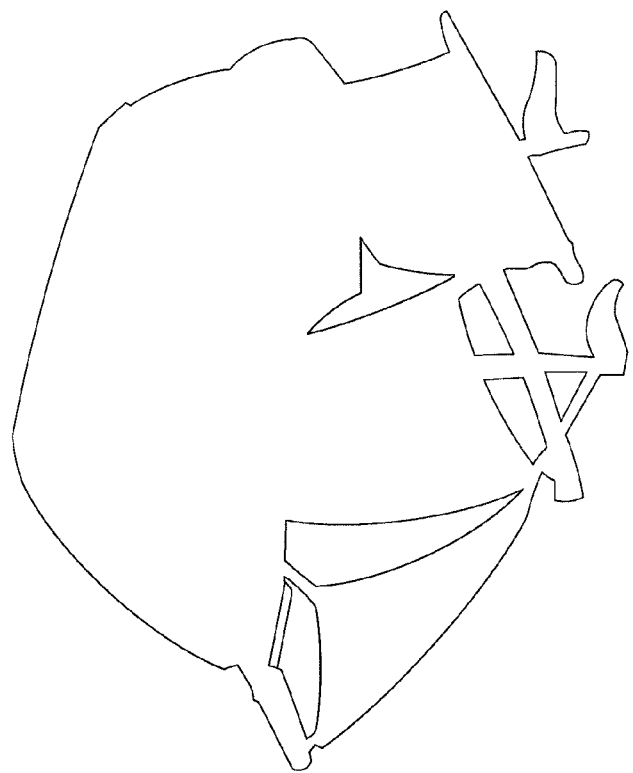
FIGS. 1A and 1B illustrate front and back views respectively of a decorative element in accordance with the present disclosure.

Persons skilled in the art will readily appreciate that various aspects of the present disclosure may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale, but may be exaggerated to illustrate various aspects of the present disclosure, and in that regard, the drawing figures should not be construed as limiting. Finally, although the present disclosure may be described in connection with various principles and beliefs, the present disclosure should not be bound by theory.

Generally speaking, the present disclosure relates to a decorative shoe lace cincher comprising a decorative element, a cincher, and a post, wherein the decorative element can be (removeably, reversibly and/or permanently) coupled to the post, and the post can be (removeably, reversibly and/or permanently) attached to either a shoe lace or the cincher.

Figure 1A:
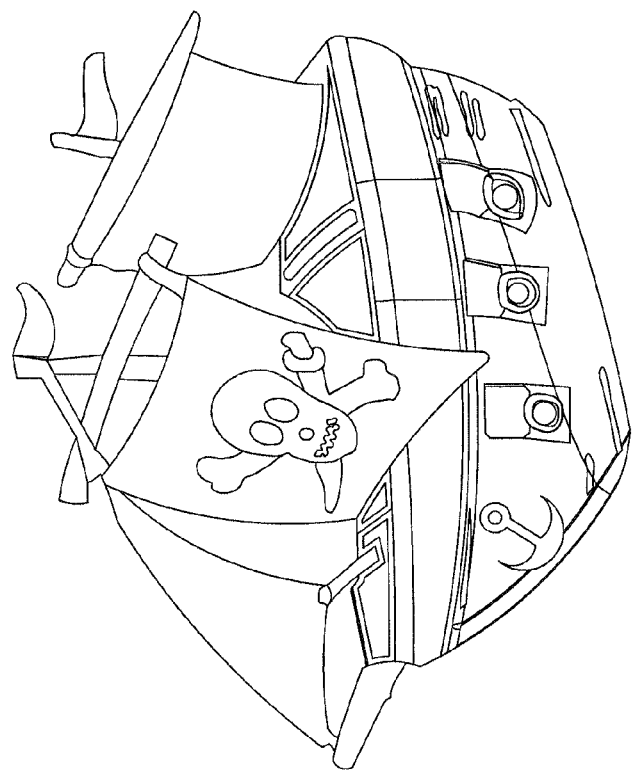

Now turning to the individual components, a decorative shoe lace cincher in accordance with the present disclosure comprises a decorative element. FIGS. 1A and 1B illustrate front and back views respectively of a decorative element 110. By way of illustration, decorative element 110 can comprise one or more of a plain feature, a colorful feature, a decorative feature, a jeweled feature, a precious jewel feature, a lighted feature, a glow-in-the dark feature, an audible feature for music or sounds, a battery operated feature, a fabric-covered feature, and the like.

Figure 1C:
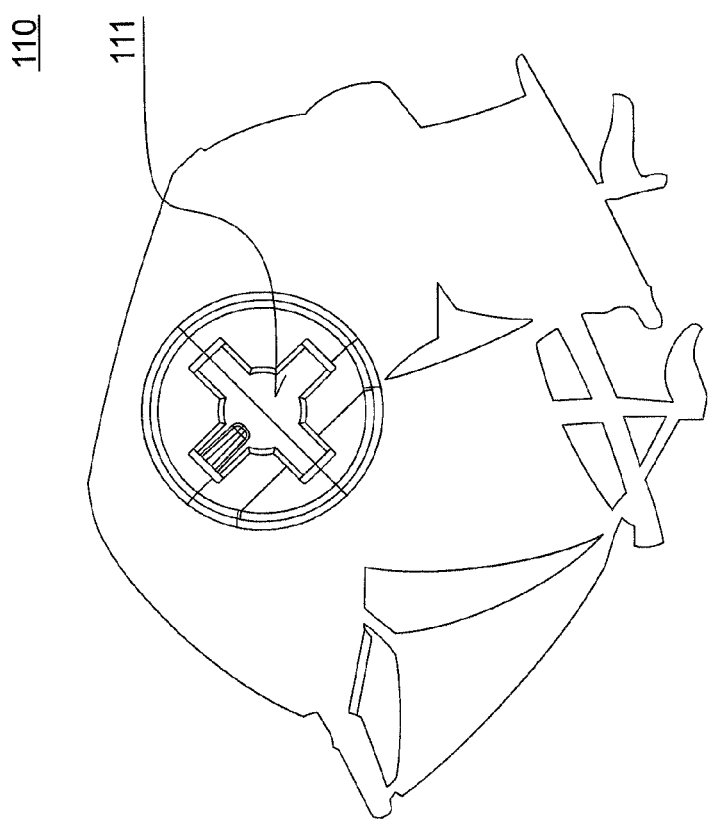
FIG. 1C illustrates an alternate embodiment of what is illustrated in FIG. 1B.

In some embodiments, decorative element 110 can comprise a flat base or surface configured to correspond to a flat base or surface of a post, as described infra. In other embodiments, and with reference to FIG. 1C, decorative element 110 can comprise a recess 111 there within, configured to topographically correspond to a protrusion of a post, as described infra.

Recess 111 can be configured to assist with the securement and/or the rotational orientation of decorative element 110. In this regard, recess 111 can be any elliptical or non-elliptical shape, not merely a cross as illustrated.

As used herein, an "elliptical" shape refers to any shape that generally lacks a point where two lines, curves, or surfaces converge to form an angle. For example, an "elliptical" shape encompasses traditional Euclidian geometric shapes such as circles and ellipses, as well as other non-angular shapes (that lack any angles), even if those shapes do not have designations common in Euclidian geometry.

As used herein, a "non-elliptical" shape refers to any shape that includes at least one point where two lines, curves, or surfaces converge to form an angle. For example, a "non-elliptical" shape encompasses traditional Euclidian geometric shapes such as triangles, rectangles, squares, hexagons, trapezoids, pentagons, stars, and the like as well as other shapes that have at least one angle even if those shapes do not have designations common in Euclidian geometry.

Decorative element 110 can also serve functions other than just being decorative. For instance, decorative element 110 can serve as a marker such as those used for marking the place of a golf ball on a putting green. Decorative element 110 can have a magnetic backing that allows attachment to a refrigerator (or anything made of metal), for example, to serve as a notice, such as a person being present in a building. Decorative element 110 can even be a tool such as a bottle opener, a nail clipper, a container, and the like. In embodiments wherein the decorative element is a container, the container can hold anything that fits in the container, including but not limited to, gum, toothpicks, makeup supplies, candy, ear plugs, ear buds, and the like. Decorative element 110 can be interchangeable onto the same or different posts and different posts can be interchangeable onto the same or different cinchers of the present disclosure.

A decorative shoe lace cincher in accordance with the present disclosure further comprises a cincher, which in turn comprises an actuator element housed between a front element and a back element.

Figure 2A:
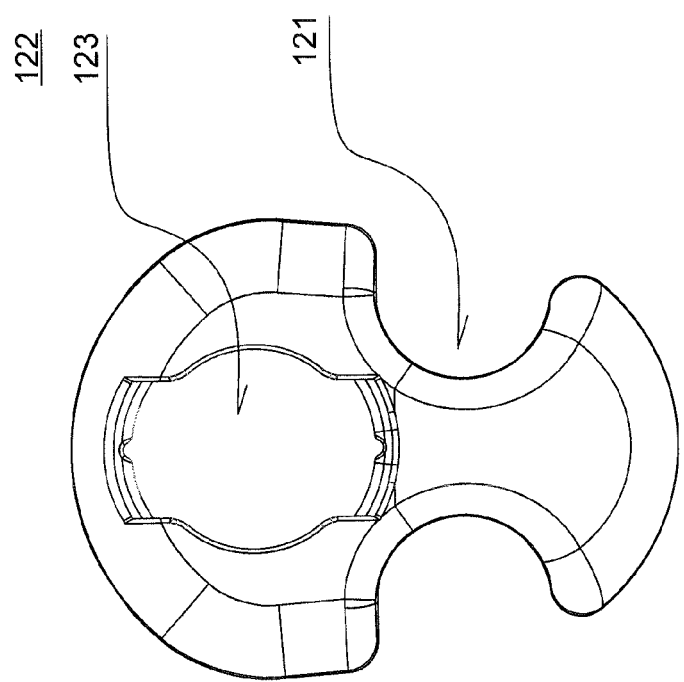
FIGS. 2A and 2B illustrate front and back views respectively of a front element of a cincher in accordance with the present disclosure.
Figure 2C:
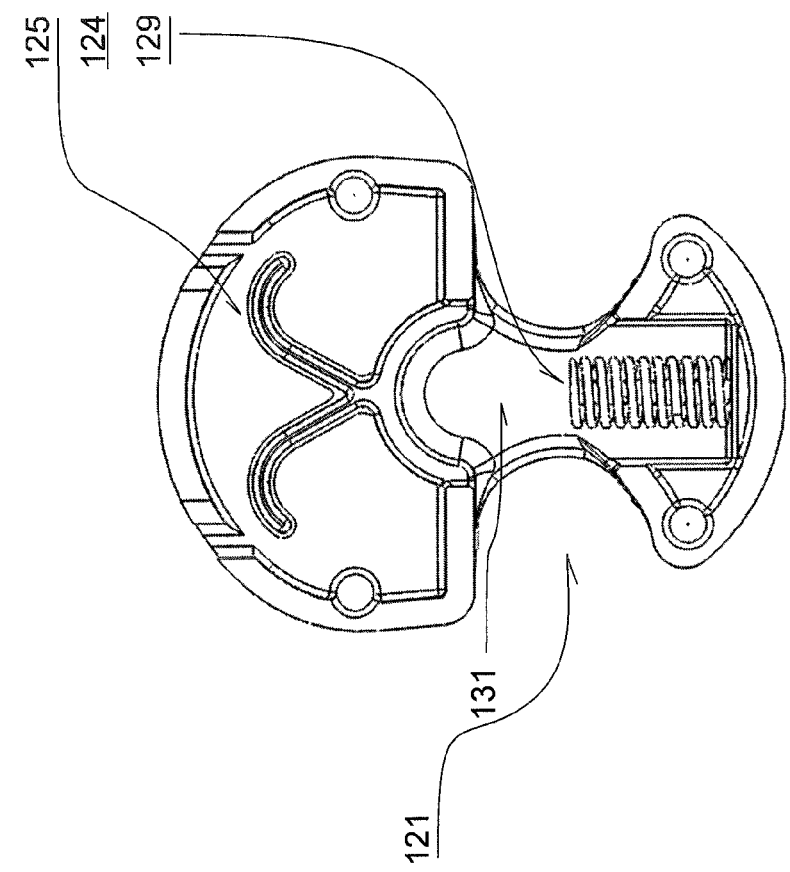
FIGS. 2C and 2D illustrate front and back views respectively of a back element of a cincher in accordance with the present disclosure.
Figure 2B:
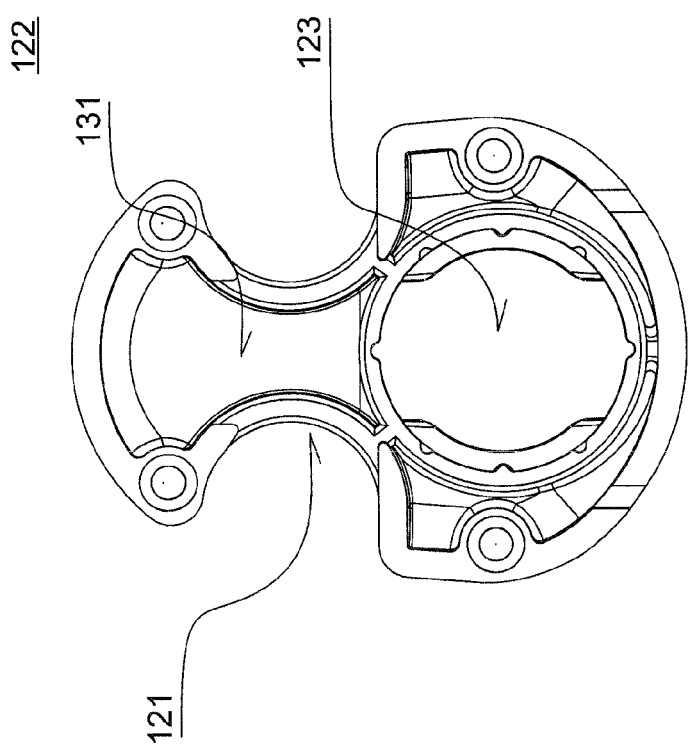

FIGS. 2A and 2B illustrate front and back views respectively of a front element 122 of a cincher. In some embodiments, front element 122 can comprise an aperture 123, configured to spatially correspond to an extension of a post, as described infra.

In other embodiments, not illustrated, front element 122 can comprise a flat base or surface for coupling directly with decorative element 110 (i.e., in embodiments not comprising a post, as described infra). Such coupling between decorative element 110 and front element 122 can be permanent or temporary and can comprise one or more of a magnet, Velcro, glue, adhesive, tape, stitching or other connection.

Figure 2E:
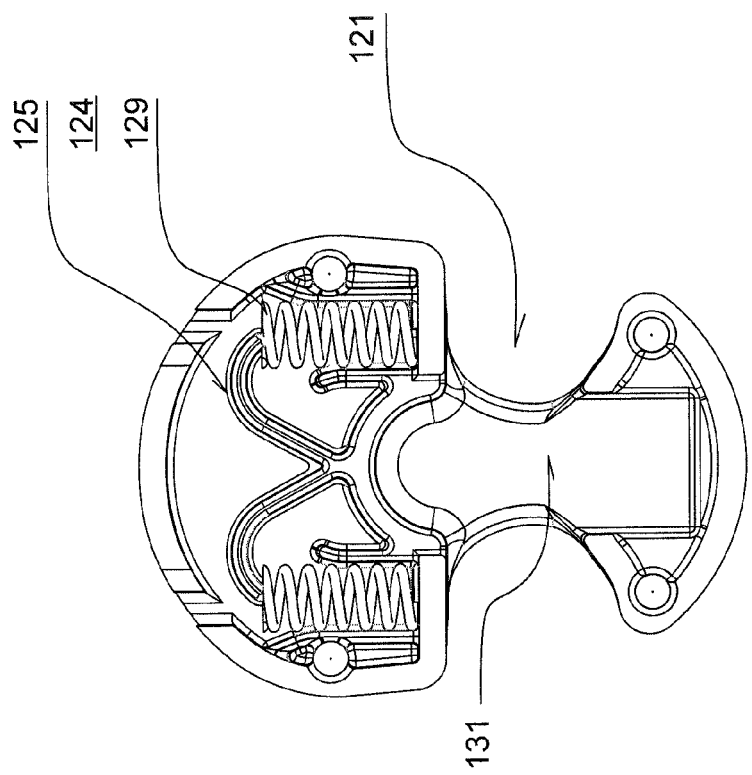
FIG. 2E illustrates an alternate embodiment of what is illustrated in FIG. 2C.
Figure 2D:
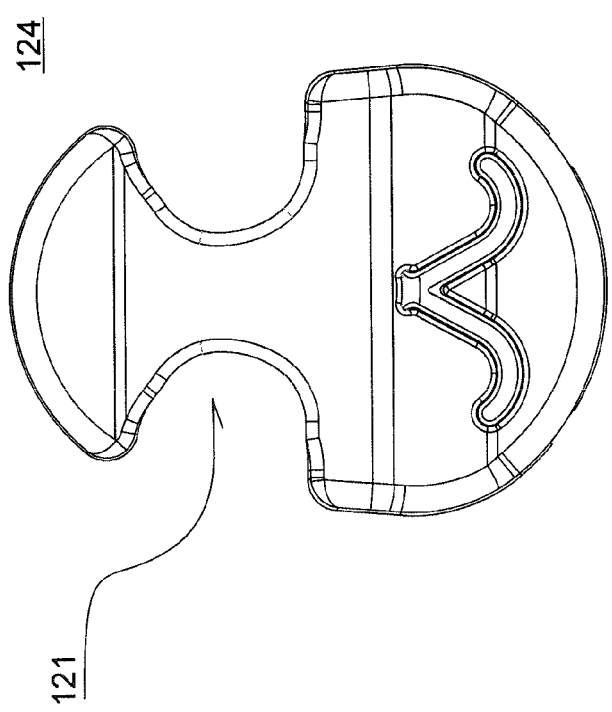

FIGS. 2C and 2D illustrate front and back views respectively of a back element 124 of a cincher. Back element 124 can comprise a resilient rib portion 125, configured to exert a resistive force against an edge or button of an actuator element, as described infra. Back element 124 can comprise one or more of a spring element 129, a rubber element, a shape memory element, and any other element that compresses and returns to its original position. Such element(s) can work independent of resilient rib portion 125 as illustrated in FIG. 2C, or can work together with resilient rib portion 125 as illustrated in FIG. 2E to exert a resistive force against an edge or button of an actuator element. In this regard, back element 124 can have a plurality (e.g., 2, 3 or more) of separate and distinct elements that cooperate to exert a resistive force against an edge or button of an actuator element.

FIGS. 2F, 2G and 2H illustrate front, back and side views respectively of an actuator element 126 of a cincher. Actuator element 126 can comprise an edge or button 127 or 128, configured to exert a force against resilient rib portion 125 and/or one or more spring elements 129 of back element 124 when pressure is applied to actuator element 126. In this manner, resilient rib portion 125 and/or one or more spring elements 129 returns actuator element 126 to its original configuration when pressure is not applied to it. Stated another way, when pressure is applied to actuator element 126, an opposing force is exerted directly or indirectly on actuator element 126 by one or more of resilient rib portion 125 and one or more spring elements 129 in various example embodiments.

Thus, and in accordance with illustrative embodiments, front element 122 and back element 124 can combine with edge or button 127 or 128 of actuator element 126 to secure one or more shoe laces passing there through when pressure is not applied to actuator element 126.

In various embodiments, a cincher comprises a channel opening 121. In example embodiments, front element 122 and back element 124 can combine to form channel opening 121. In general, channel opening 121 is configured to assist with the receiving and/or directioning of one or more shoe laces there through. As illustrated, channel opening 121 can be concave. However, various other configurations are contemplated, for example frustoconical.

In example embodiments, when pressure is applied to actuator element 126 the shoe lace is not secured and a shoe lace channel 131 is open (or substantially open), and when pressure is not applied to actuator element 126 the shoe lace is secured and shoe lace channel 131 is closed (or substantially closed). In this regard, shoe lace channel 131 is generally any pathway extending between channel openings 121 through a cincher that can be actuated between open and closed positions. In example embodiments, front element 122, back element 124, and actuator element 126 can combine to form shoe lace channel 131

Figure 3:
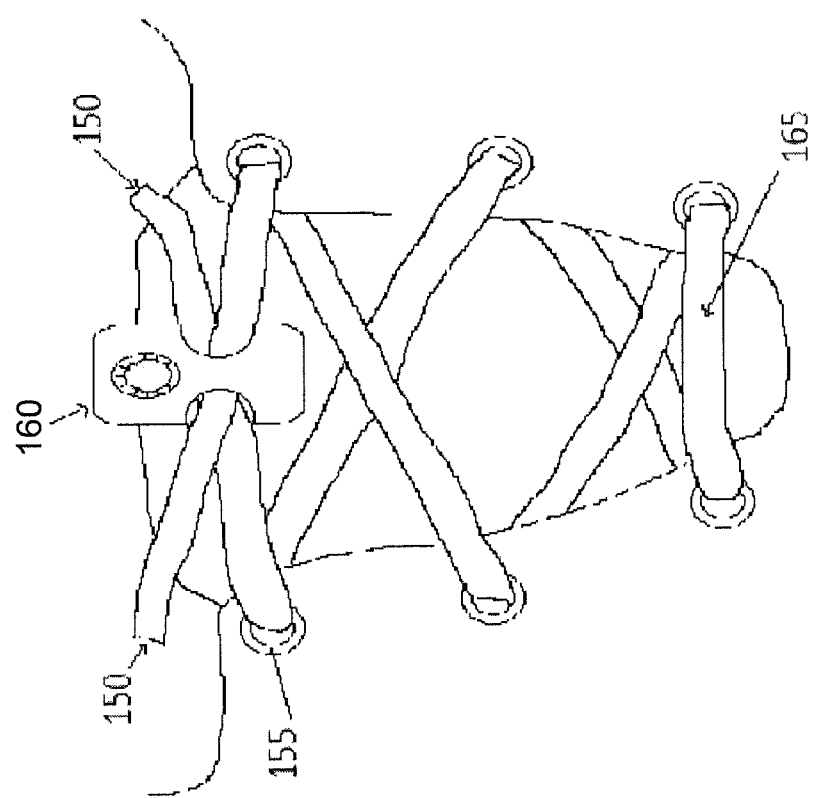
FIG. 3 illustrates a cincher located on both ends of a shoe lace in accordance with the present disclosure.

With reference now to FIG. 3, a cincher 160 of the present disclosure can be located on one or both ends 150 of the shoe lace 165, between the last threaded eyelet(s) 155 and the end(s) 150 of the lace. In this manner, a cincher can be a single mechanical device for each end of the shoe lace end (two would be used on a single shoe), or can be a single mechanical device that captures and holds both ends of the shoe lace and functions much as a knot would, as illustrated in FIG. 3.

In embodiments wherein a cincher holds both lace ends, the cincher can hold one of the lace ends in an operationally permanent manner, while allowing the other lace end to be reversibly cinched (tightened and loosened). In example embodiments, a first end of the shoe lace is secured only when pressure is not applied to the actuator element, and a second end of the shoe lace is secured both when pressure is applied to the actuator element and when pressure is not applied to the actuator element. In this configuration, a person tightening the shoe lace would only be tightening or loosening one of the lace ends, making the tightening or loosening of the shoe an easier operation. Operationally permanent as used herein means that one of the shoe lace ends is meant to be permanently or temporarily attached to the cincher and not removed or loosened, while the other lace end is free to be reversibly cinched and/or removed from the cincher.

The mechanism of cinching can be anything that allows easy one directional motion of the lace (tightening of the shoe lace) and tends to hold, resist, or prevent the opposite motion of the lace (loosening of the shoe lace) from occurring. Cinching can comprise friction in one form or another (entanglement, pressure from two or more sides of the lace, hooks shaped like barbs, and the like) to facilitate the ease of tightening and resist loosening. The ability to loosen the lace can require some action to deactivate the mechanism that is performing the cinching. The action required to deactivate the cinching mechanism can be the pressing of a button, the twisting of a knob, the pull of a lever arm, the pull of the lace in a direction orthogonal to the direction used to tighten the lace, or any other action that triggers the release of the cinching mechanism. In embodiments wherein the cincher holds both shoe lace ends, the release of the cinching mechanism can be for both laces at once, or for either shoe lace end separately.

Figure 4C:
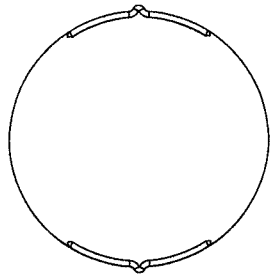
FIGS. 4A, 4B and 4C illustrate back, side and front views respectively of a post in accordance with the present disclosure.
Figure 4B:
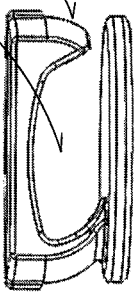
Figure 4A:
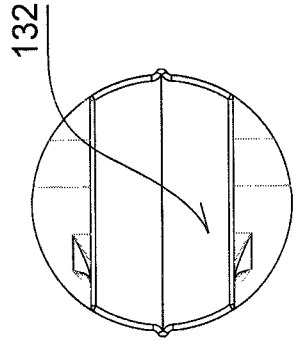
Figure 4E:
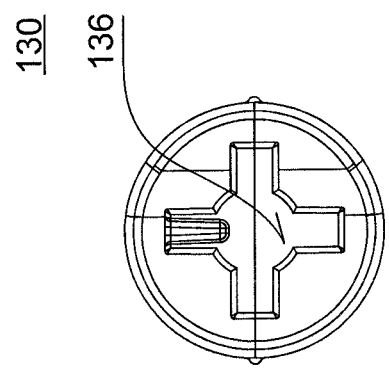
FIGS. 4D and 4E illustrate alternate embodiments of what is illustrated in FIGS. 4B and 4C respectively.
Figure 4D:
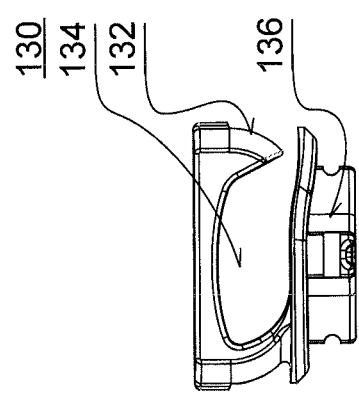

A decorative shoe lace cincher in accordance with the present disclosure still further comprises a post in various embodiments, though as will be described infra, a post is not required. FIGS. 4A, 4B and 4C illustrate back, side and front views respectively of a post 130. In some embodiments, post 130 can comprise a flat base or surface configured to correspond to a flat base or surface of decorative element 110. In other embodiments, and with momentary reference to FIGS. 4D and 4E, post 130 can comprise a protrusion 136, configured to topographically correspond to recess 111 of decorative element 110.

In either manner, decorative element 110 can be coupled to post 130. Such coupling between decorative element 110 and post 130 can be permanent or temporary and can comprise one or more of a magnet, Velcro, glue, adhesive, tape, stitching or other connection. Still further, decorative element 110 and post 130 can be a unitary structure.

Post 130 can comprise an extension 132, configured to define a shoe lace pathway 134 by which post 130 can be removeably attached to one or more shoe laces threaded through shoe lace pathway 134. More broadly, post 130 can be configured to attached to the material to which cincher is attached. In other embodiments, shoe lace pathway 134 facilitates the removeable attachment of post 130 to jewelry, accessories such as purses and backpacks, hair, clothing, ribbons, strings, ropes, necklaces, and the like.

In general, the post can be reversibly removable from the lace, and thus any mechanism that functions to allow the reversible attachment of the post to the lace is useful for the present disclosure, including but not limited to, clipping (paper clip style), entangling (such as threading lace around and through various protrusions), clamping (clothes pin style), pinning (safety pin type of mechanism), piercing (post and post holder similar to stud style earrings), Velcro loop, loop with snap fasteners, two magnets (or steel and a magnet), and hooking (directional barbs that hold the lace). In an example embodiment, a cinching device may comprise a magnet and a decorative element may be made of metal, or vice versa, such that the post is either the magnet or the metal, depending on point of view. Stated another way, the post may be comprised of a part of the cincher or the decorative element, but otherwise be absent from a cincher of the present disclosure.

Alternatively, or in addition, extension 132 can be configured to spatially correspond to, and/or removeably attach into aperture 123 in front element 122. Extension 132 can be further configured to removeably lock into aperture 123 upon a twisting motion of post 130 relative to the cincher. In this regard, different decorative elements can be reversibly removable and interchangeable into aperture 123. In example embodiments, such different decorative elements are attached to different posts having spatially corresponding or otherwise substantially similar extensions 132.

In various embodiments, decorative element 110 is properly aligned only after twisting of post 130 relative to the cincher. In general, extension 132 can be configured to lock, slide, snap, button, hook, pop and/or attach to aperture 123 in front element 122 by one or more magnets, Velcro and other connection methods. In this manner, post 130 can be removeably attached to the cincher.

In an embodiment, a device of the present disclosure comprises a decorative element that is attached to a post, wherein the post is configured to attach to a shoe lace and separately is configured to attach to a cincher. The cincher is configured to hold the laced or threaded part of the shoe lace tight while the cinching mechanism is activated, but allows the shoe lace to loosen when the cinching mechanism is deactivated. The cincher is capable of cinching one or both shoe lace ends on a shoe. The decorative attachment to the post can be permanent or reversible. The post attachment to the cincher can be permanent or reversible.

Finally, any portion of a decorative shoe lace cincher as described herein, can be comprised of one or more of a plastic (e.g., acrylonitrile butadiene styrene and the like), rubber, wood, mineral, textile, metal, composite material, etc. Such material(s) can be selected as being one or more of easy to clean, durable, scratch resistant, lightweight, resistant to discoloration, aesthetically pleasing, and the like.

It will be apparent to those skilled in the art that various modifications and variations can be made in the present disclosure without departing from the spirit or scope of the disclosure. For example, while the present disclosure has been described primarily with reference to shoe laces, a decorative cincher in accordance with the present disclosure can be used with any lace, ribbon, string, rope, necklace, or like medium. Thus, it is intended that the embodiments described herein cover the modifications and variations of this disclosure provided they come within the scope of the appended claims and their equivalents.

Numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications can be made, especially in matters of structure, materials, elements, components, shape, size and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein.

We claim:

1. A device for securing a shoe lace comprising:
    a decorative element;
    a cincher further comprising an aperture, and a channel opening for receiving and directioning a shoe lace through a shoe lace channel; and
    a post coupled to the decorative element, and further comprising an extension configured to removeably attach into the aperture, the extension further defining a pathway through which the shoe lace can be threaded.

2. The device of claim 1, wherein the post further comprises a protrusion configured to topographically correspond to a recess within the decorative element.

3. The device of claim 1, wherein the cincher further comprises an actuator element, wherein when pressure is applied to the actuator element a first end of the shoe lace is not secured and the shoe lace channel is open, and wherein when pressure is not applied to the actuator element the first end of the shoe lace is secured and the shoe lace channel is closed.

4. The device of claim 3, wherein when pressure is applied to the actuator element, an opposing force is exerted directly or indirectly on the actuator element by one or more of a resilient rib portion and a spring element.

5. The device of claim 1, wherein the cincher further comprises an actuator element, wherein a second end of the shoe lace is secured both when pressure is applied to the actuator element and when pressure is not applied to the actuator element.

6. The device of claim 1, wherein the channel opening is concave.

7. The device of claim 1, wherein the extension is configured to removeably attach to the aperture.

8. The device of claim 7, wherein the extension is configured to removeably lock into the aperture upon twisting of the post relative to the cincher.

9. The device of claim 8, wherein the decorative element is properly aligned only after twisting of the post relative to the cincher.

10. The device of claim 1, wherein the decorative element is reversibly attached to the post by a magnet.

11. The device of claim 1, wherein the post is reversibly attached to the cincher by a magnet.

12. The device of claim 1, wherein the cincher is comprised of acrylonitrile butadiene styrene.

13. A decorative system for tightening and loosening comprising:
- a cincher;
- a medium;
- a decorative element coupled to a post; and
- a different decorative element coupled to a different post;
- wherein the cincher is configured to cinch the medium;
- wherein the post is removably attached to the cincher; and
- wherein the different post is interchangeable with the post and can be removably attached to the cincher when the post is removed from the cincher.

14. The system of claim 13, wherein the post is further configured to attach to the medium.

15. The system of claim 13, wherein the decorative element comprises a golf ball marker, a bottle opener, a nail clipper, or a container.

16. The system of claim 13, wherein the medium comprises a shoe lace, lace, ribbon, string, rope, or necklace.

17. A cinching device comprised of a decorative element, a post, and a cincher, wherein the decorative element is attached to the post, and wherein the post is attached to the cincher, wherein the cincher comprises one or more of a resilient rib portion and a spring element.

* * * * *